Patented Jan. 3, 1928.

1,654,779

UNITED STATES PATENT OFFICE.

RAYMOND C. BENNER, OF BAYSIDE, ARTHUR J. BRIGGS, OF SYRACUSE, AND JOHN H. FINK, OF BROOKLYN, NEW YORK, ASSIGNORS, BY MESNE ASSIGNMENTS, TO PREST-O-LITE STORAGE BATTERY CORPORATION, A CORPORATION OF INDIANA.

PROCESS OF MAKING PREFORMED NEGATIVE ELECTRODES.

No Drawing. Application filed July 10, 1923. Serial No. 650,729.

This invention relates to the manufacture of negative electrodes for lead-sulfuric acid storage cells. A particular object of the invention is to provide improved electrodes capable of being used without preliminary charging. This is accomplished principally by electrode positing the lead which is to form the negative active material from a special electrolyte under regulated conditions, and by preventing oxidation of such lead, including the use of non-oxidizing liquids in preparing the lead for application to its support.

It has heretofore been proposed to make stable or "permanized" negative plates by applying lead compounds to a grid or the like, electrolytically reducing the compounds in situ to metallic lead, and drying the plate under conditions preventing oxidation. The product resulting from this prior process does not oxidize on exposure to the air. It may be stored and shipped in dry condition and will give satisfactory service without charge after assembly with suitable electrolyte and positive plates.

According to the present invention, the procedure described is simplified by eliminating the initial reduction or "forming" of the negative active material. Positive advantages, in addition to those inherent in the earlier process, are also obtained by the improved methods, hereinafter described, for depositing the lead and applying it to supports.

In carrying out the process in a preferred form, finely divided lead is prepared by electrodeposition with use of a lead anode. We have discovered that particular advantages are obtained by the use of an acidified solution of calcium acetate as the electrolytic bath from which lead is to be deposited. The solution preferably contains about 15% of the salt and is made slightly acid with acetic acid. The cathode also may advantageously be made of lead and the current density may be about ½ ampere per square inch of cathode surface. These conditions may be varied as desired, so long as lead is deposited in a non-coherent form suitable for subsequent treatment. Modifications may of course be necessary in particular circumstances to obtain the maximum results from the electrical power expended.

Filamentous or feathery lead having a somewhat crystalline structure is best adapted for the present process. Spongy lead may also be used but tends to become too compact and may give trouble by floating to the surface of the electrolytic bath, with the result of short circuiting the electrodes. Also, acetates or acetic acid, retained by spongy lead on its removal from the electrolyte, can be washed from the lead only with difficulty. Such retained compounds are very detrimental to the life of the battery. Filamentous or feathery lead is much more readily purified than is spongy lead.

Lead deposited under the general conditions described is feathery and has a low apparent density. It gives particularly effective service in preformed negative plates, but is also excellently adapted for use in other ways, including the manufacture of preformed positive electrodes. In an application Serial No. 650,728, filed of even date herewith by R. C. Benner and J. H. Fink, this latter use is discussed in detail.

Other electrolytic solutions nevertheless come within the scope of this invention. For example, good results have been obtained with lead acetate solutions of from 5 to 20% strength, acidified with acetic acid.

The deposited lead is taken from the electrolytic bath from time to time as it accumulates about the cathode, and the retained electrolyte is removed by means which do not unduly compact the lead. Centrifuging followed by washing with hot water is desirable. The finely divided metal is readily oxidizable and the water should therefore be substantially freed from dissolved air. The wet, finely divided lead should be handled rapidly in a manner to expose it as little as possible to the air, so as to prevent oxidation. Non-aqueous liquids may be used in washing the lead, which may or may not be given a preliminary treatment with air-free water, as described in Patent No. 1,439,994, granted to R. C. Benner on December 26, 1922.

After the electrolyte has been washed out with substantial completeness, the lead may be partially dried by centrifuging. It is then completely dried, preferably by heating to a temperature of about 120–130° C. in an atmosphere of nitrogen, carbon dioxid, or other inert gas, or in an evacuated chamber. The lead may be allowed to cool before exposure to the air, but when properly dried it does not oxidize objectionably when so exposed, although its temperature may be around 100° C. If volatile, non-oxidizing liquids, such as ethyl alcohol or acetone, are used in removing the wash water, the plates may be dried in the air without danger of appreciable oxidation.

The dried lead is shredded or ground, and is then pressed upon suitable supports. The pressure used should be sufficient only to insure coherence, in order that the porosity of the active material may be as high as possible. Satisfactory results are generally obtained with pressures of 750–1000 lbs. per square inch. Since the lead is oxidized only to a slight extent, if at all, relatively low pressures suffice to make it cohere. This would not be the case in the compacting of superficially oxidized lead. The film of oxid on the lead fragments would prevent their coalescence, and result in the formation of a mass which would disintegrate readily, unless subjected to materially higher pressure than is necessary for applying unoxidized lead. Such higher pressures result in densifying the active material to an injurious extent.

Improved results are obtained by the procedure described, and we have discovered that further advantages may be obtained if the dry, finely divided lead is made up into a pasty composition with a non-oxidizing liquid, for example ethyl or methyl alcohol. Such compositions may be satisfactorily placed upon supports with pressures which can be exerted by hand, using a spatula or other suitable tool, but higher pressures are generally desirable in commercial operation. Pressures up to about 5000 lbs. per sq. in. are suitable; beyond this point the compressed material usually becomes to dense. Hydraulic presses or other means may be used. Plates of a more uniform density may be obtained when alcohol or the like is the pasting liquid than when dry lead is applied to the supports, apparently owing to a sort of lubricating action of the liquid upon the particles, which facilitates their even distribution.

The plates may be exposed to the air to permit the alcohol or other volatile liquid to evaporate. The lead is not appreciably oxidized during such drying, nor during subsequent exposure in dry condition to the air. This is true also of the negative electrodes made without the use of organic liquids which were described above. Electrodes of both types give satisfactory service, without preliminary charge, when assembled with suitable positives and electrolyte. In the application of Benner and Fink above referred to, preformed positive plates adapted for assembly with such negative plates, or for other purposes, are described and claimed.

The liquid used in admixture with the lead should not cause it to become oxidized, and, if non-voltaile, it should have no harmful effect upon the battery. Various liquids may meet these requirements, but the monohydroxy alcohols, especially methyl and ethyl alcohol, are preferred. Glycerine may also be used. It has no chemical action on metallic lead, and our use of it is to be distinguished from prior processes for making lead oxid-glycerine cements. Small amounts of water in the organic liquid are not usually objectionable. Commercial 95% ethyl alcohol is sufficiently free from water for the present purpose.

It is frequently desirable to add "expanders" to the negative active materials. These are substances adapted to prevent the consolidation of the lead. In an application Serial No. 661,934, filed Sept. 10, 1923, by R. C. Benner, and L. C. Werking, preferred expanders and methods of applying them are described and claimed.

When electrodes of especially light weight and high porosity are desired, a material adapted to impart these qualities may be mixed with the lead. Various materials are suitable, but we prefer to use lead sulfate, as this gives adequate porosity and does not introduce any foregn elements into the battery. From about 10% to about 40% by weight of lead sulfate may be used with advantage. Since the specific gravity of the lead used is approximately 11.30 and that of lead sulfate about 6.23, it is evident that when material amounts of the latter are present the weight of the electrode is considerably reduced. When lead is formed by reduction of the relatively more bulky sulfate, in the operation of the battery, a porous structure is produced. The capacity of the plate is beneficially affected by the initial presence of the sulfate, owing to this increased porosity.

We are aware that it has been proposed to make preformed negative plates by compacting superficially oxidized lead particles upon a suitable support. Heavy pressure is required to make the oxidized lead sufficiently coherent, and as a result the service characteristics, affected by the lack of porosity in the plate, are not usually of the best. In distinction to such prior processes, the present invention includes the prepartion of preformed negative plates by application of finely divided lead, substantially free from oxid, to supporting structures, the pressure used being relatively low.

The resulting product is a negative electrode of satisfactory coherence, although having a porous structure. Numerous advantages follow from the porosity of the active material, including high ampere-hour capacity and freedom from buckling when the lead is converted into sulfate. The electrodes have a low apparent density and the weight of the battery is correspondingly lower than when heavily compressed active material is used. The feasibility of low pressure makes simplified compression mechanism practical, materially reducing the cost of production. The use of calcium acetate solution as the electrolytic bath, aside from its technical advantages, is a marked economy, as the salt can be obtained at a comparatively low price.

These and other advantages of the invention are not dependent solely upon the specific procedure described and various modifications of such procedure may be made within the scope of the appended claims.

We claim:

1. Process of making preformed negative electrodes, comprising preparing finely divided lead and applying it to a support, all under conditions substantially preventing oxidation.

2. Process of making preformed negative electrodes, comprising preparing finely divided lead under conditions substantially preventing oxidation, mixing said lead with a non-oxidizing liquid adapted to facilitate its application to a support and to prevent oxidation of said lead, and applying the composition thus formed to a support.

3. Process of making preformed negative electrodes, comprising preparing finely divided lead under conditions substantially preventing oxidation, mixing said lead with ethyl alcohol to facilitate its application to a support and to prevent oxidation of said lead, and applying the composition thus formed to a support.

4. Process of making preformed negative electrodes, comprising preparing finely divided lead and applying it to a support, all under conditions substantially preventing oxidation, and compressing the lead upon the support by pressure of from 750 to 1000 lbs. per sq. in.

5. Process of making preformed negative electrodes, comprising preparing finely divided lead under conditions substantially preventing oxidation, mixing said oxid-free lead with a non-oxidizing alcoholic liquid adapted to facilitate its treatment, placing the resulting mixture upon a support, and compressing it thereon, whereby an electrode of satisfactory coherence is obtained.

6. Process of preparing active material for storage cells, comprising electrodepositing lead in finely divided condition from a solution containing calcium acetate, using a lead anode.

7. Process of preparing active material for storage cells, comprising electrodepositing lead in finely divided condition from a solution containing about 15% calcium acetate and acidified with acetic acid, using a lead anode.

8. Process of making preformed negative electrodes, comprising electrodepositing lead in finely divided condition from a solution containing calcium acetate, using a lead anode, and applying the lead to a support, all under conditions substantially preventing oxidation.

9. Process of making preformed negative electrodes, comprising electrodepositing lead in finely divided condition from a solution containing calcium acetate, using a lead anode, further subdividing the thus formed lead, and applying the lead to a support, all under conditions substantially preventing oxidation.

10. Process of making preformed negative electrodes, comprising electrodepositing lead in finely divided condition from a solution containing calcium acetate, using a lead anode, mixing said lead with a non-oxidizing liquid adapted to facilitate its application to a support, and applying the composition thus formed to a support.

11. Process of making preformed negative electrodes, comprising preparing lead in finely divided condition, adding thereto a material adapted to increase porosity, and applying the mixture to a support, all under conditions substantially preventing oxidation.

12. Process of making preformed negative electrodes, comprising preparing lead in finely divided condition, adding thereto lead sulfate to increase porosity, and applying the mixture to a support, all under conditions substantially preventing oxidation.

13. Process of making preformed negative electrodes, comprising preparing lead in finely divided condition, adding thereto lead sulfate in amounts of from 10 to 40% of the weight of the active material to increase porosity, and applying the mixture to a support, all under conditions substantially preventing oxidation.

In testimony whereof, we affix our signatures.

RAYMOND C. BENNER.
JOHN H. FINK.

In testimony whereof, I affix my signature.

ARTHUR J. BRIGGS.